United States Patent
Hutchings

(10) Patent No.: US 10,216,199 B2
(45) Date of Patent: Feb. 26, 2019

(54) RESERVOIR CONTROL SYSTEMS AND METHODS

(71) Applicant: South East Water Corporation, Frankston, Victoria (AU)

(72) Inventor: Kevin Hutchings, Mentone (AU)

(73) Assignee: South East Water Corporation, Frankston, Victoria (AU)

( * ) Notice: Subject to any disclaimer, the term of this patent is extended or adjusted under 35 U.S.C. 154(b) by 707 days.

(21) Appl. No.: 14/597,387

(22) Filed: Jan. 15, 2015

(65) Prior Publication Data

US 2015/0227142 A1 Aug. 13, 2015

Related U.S. Application Data

(63) Continuation of application No. PCT/AU2014/000887, filed on Sep. 10, 2014.

(51) Int. Cl.
| | |
|---|---|
| *G05D 9/00* | (2006.01) |
| *G05D 7/06* | (2006.01) |
| *G05D 9/12* | (2006.01) |
| *E03F 5/10* | (2006.01) |
| *G05B 15/02* | (2006.01) |

(52) U.S. Cl.
CPC ........... *G05D 7/0617* (2013.01); *E03F 5/101* (2013.01); *G05B 15/02* (2013.01); *G05D 9/12* (2013.01)

(58) Field of Classification Search
None
See application file for complete search history.

(56) References Cited

U.S. PATENT DOCUMENTS

| | | | |
|---|---|---|---|
| 6,378,554 B1 | 4/2002 | Struthers et al. | |
| 6,395,181 B1 | 5/2002 | Mullerheim et al. | |
| 6,491,060 B2 | 12/2002 | Struthers et al. | |

(Continued)

FOREIGN PATENT DOCUMENTS

| | | |
|---|---|---|
| AU | 2014100179 | 4/2014 |
| CN | 1473075 | 2/2004 |

(Continued)

OTHER PUBLICATIONS

International Type Search Report, Australian Patent Application No. 2013903464, dated Jan. 20, 2014.

(Continued)

*Primary Examiner* — Paul B Yanchus, III
(74) *Attorney, Agent, or Firm* — Kilpatrick Townsend & Stockton LLP

(57) ABSTRACT

Embodiments relate generally to a management system for controlling operations of a reservoir. The management system comprises a wireless transceiver in communication with a controller associated with the reservoir to allow the management system to communicate with the controller over a communications network. The management system further comprises a processor for determining weather data for a particular region, wherein the reservoir is associated with the region, determining operation instructions based on at least the weather data; and transmitting via the wireless transceiver a command signal to the controller, wherein the command signal includes operation instructions for activating a flow control mechanism associated with the reservoir.

39 Claims, 9 Drawing Sheets

(56) References Cited

U.S. PATENT DOCUMENTS

| | | | |
|---|---|---|---|
| 6,595,051 | B1 | 7/2003 | Chandler et al. |
| 6,638,023 | B2 | 10/2003 | Scott et al. |
| 7,014,777 | B2 | 3/2006 | Ishikawa et al. |
| 7,072,945 | B1 | 7/2006 | Nieminen et al. |
| 7,289,923 | B2 | 10/2007 | Marovitz et al. |
| 7,342,506 | B2 | 3/2008 | Paoli et al. |
| 7,799,215 | B2 | 9/2010 | Matheis et al. |
| 8,594,851 | B1 | 11/2013 | Smaidris et al. |
| 8,600,568 | B2 | 12/2013 | Smaidris et al. |
| 8,983,667 | B2 | 3/2015 | Smaidris et al. |
| 9,869,430 | B2 | 1/2018 | Moon et al. |
| 2003/0075502 | A1 | 4/2003 | Mullerheim et al. |
| 2005/0072469 | A1* | 4/2005 | Preul ............... E03F 5/102 137/247.13 |
| 2006/0078435 | A1 | 4/2006 | Burza et al. |
| 2006/0267756 | A1 | 11/2006 | Kates |
| 2007/0103324 | A1 | 5/2007 | Kosuge et al. |
| 2008/0290011 | A1 | 11/2008 | Capano et al. |
| 2009/0081050 | A1 | 3/2009 | Moore et al. |
| 2009/0082977 | A1 | 3/2009 | Parkinson et al. |
| 2010/0156632 | A1 | 6/2010 | Hyland et al. |
| 2010/0268389 | A1 | 10/2010 | Wurm et al. |
| 2011/0068060 | A1 | 3/2011 | Hatten et al. |
| 2011/0120561 | A1* | 5/2011 | Quigley ............... E03F 1/00 137/1 |
| 2011/0168609 | A1 | 7/2011 | McQuade et al. |
| 2011/0240535 | A1 | 10/2011 | Pehrson et al. |
| 2011/0304475 | A1 | 12/2011 | Higgins et al. |
| 2011/0307106 | A1 | 12/2011 | Dutt et al. |
| 2012/0029709 | A1* | 2/2012 | Safreno ............... A01G 25/16 700/284 |
| 2012/0194502 | A1 | 8/2012 | Smith et al. |
| 2013/0243614 | A1 | 9/2013 | Moon et al. |
| 2013/0307701 | A1 | 11/2013 | Forster-Knight |
| 2017/0227391 | A1 | 8/2017 | Forster-Knight et al. |

FOREIGN PATENT DOCUMENTS

| | | |
|---|---|---|
| CN | 101021725 | 8/2007 |
| CN | 101042587 A | 9/2007 |
| CN | 201258267 | 6/2009 |
| CN | 201496242 | 6/2010 |
| CN | 101800766 | 8/2010 |
| JP | 2010203964 | 9/2010 |
| JP | 2014-139373 A | 7/2014 |
| NZ | 589998 | 10/2011 |
| WO | 2006060296 | 6/2006 |
| WO | 2011017104 | 2/2011 |
| WO | 2011110792 | 9/2011 |
| WO | 2013149281 | 10/2013 |

OTHER PUBLICATIONS

International Search Report, PCT Application No. PCT/AU2014/000887, dated Oct. 21, 2014.
Written Opinion, PCT Application No. PCT/AU2014/000887, dated Oct. 21, 2014.
Cheng, et al., Flood Control Management System for Reservoirs, Environmental Modelling & Software, 2004, No. 19, pp. 1141-1150.
U.S. Appl. No. 13/676,177, Final Office Action, dated Feb. 19, 2016, 12 pages.
U.S. Appl. No. 13/676,177, Final Office Action, dated May 15, 2017, 14 pages.
U.S. Appl. No. 13/676,177, Non-Final Office Action, dated Sep. 2, 2016, 10 pages.
U.S. Appl. No. 13/676,177, Non-Final Office Action, dated Sep. 8, 2015, 9 pages.
Australian Patent Application No. 2013903464, International Type Search Report, dated Jan. 20, 2014, 15 pages.
Chinese Patent Application No. 201280071396.8, Office Action, dated Jun. 1, 2016.
European Patent Application No. 12865548, Supplementary European Search Report, dated Jul. 14, 2014.
International Search Report, PCT Application No. PCT/AU2012/000903, dated Oct. 17, 2012.
New Zealand Patent Application No. 615470, First Exam Report, dated Jan. 15, 2015.
New Zealand Patent Application No. 703230, First Exam Report, dated Jan. 15, 2015.
PCT Patent Application No. PCT/AU2012/000903, Written Opinion, dated Oct. 17, 2012.
PCT Patent Application No. PCT/AU2015/050519, International Search Report, dated Nov. 13, 2015.
PCT Patent Application No. PCT/AU2015/050519, Written Opinion, dated Nov. 13, 2015.
Search Report, Chinese Patent Application No. 201280071396.8, dated Jun. 1, 2016.
U.S. Appl. No. 13/676,177, Notice of Allowance, dated Sep. 6, 2017, 13 pages.
U.S. Appl. No. 15/507,595, Non Final Office Action dated Jun. 22, 2018, 11 pages.
Stoianov et al., Pipenet: A Wireless Sensor Network for Pipeline Monitoring, IPSN '07, Cambridge, Massachusetts, Apr. 25-27, 2007, pp. 264-273.
U.S. Appl. No. 13/676,177, Supplemental Notice of Allowance, dated Sep. 25, 2017.

* cited by examiner

RESERVOIR CONTROL SYSTEMS AND METHODS

RELATED APPLICATIONS

This application is a continuation of PCT/AU2014/000887, which claims priority to AU 2013903464, both of which are incorporated herein by reference.

TECHNICAL FIELD

Described embodiments generally relate to systems and methods for controlling components associated with reservoirs, such as flow control mechanisms or valves. Some embodiments specifically relate to control systems for reservoirs, while other embodiments relate to systems for managing a network of reservoirs including described control systems. Further embodiments relate to reservoir control installations or kits therefor that include the control systems.

BACKGROUND

The build-up of residential areas around creeks and rivers has led to trees and vegetation being replaced with impervious surfaces, such as concrete drives and roofs. This has resulted in water from rain, snow melt, or other sources flowing quickly over the landscape as opposed to being absorbed by soil and vegetation. Such excess water flow is known as "runoff". "Runoff" has environmental consequences for creeks and rivers such as changing stream flows, causing flooding and erosion of river banks, as well as washing pollutants from urban areas into the rivers and creeks.

"Runoff" is particularly prevalent during and after storms, where the high volume and rate of stormwater wreaks havoc on the local environment. In an attempt to manage stormwater "runoff", stormwater infrastructure may be installed in urban areas. Such stormwater infrastructure is designed based on estimated likely peak flows using nominated risk models and incorporates standard safety margins. Consequently, a significant proportion of infrastructure costs are attributable to events that rarely occur. As a city grows, so too do the impervious surfaces, and as a result, these peak flows increase. Accordingly, greater loads are placed on stormwater infrastructure, and in the worst cases, overwhelm the stormwater infrastructure, which may not have been designed with such increased peak flows in mind in the first place.

It is therefore desired to address or ameliorate one or more shortcomings of prior systems and methods, or to at least provide a useful alternative thereto.

Throughout this specification the word "comprise", or variations such as "comprises" or "comprising", will be understood to imply the inclusion of a stated element, integer or step, or group of elements, integers or steps, but not the exclusion of any other element, integer or step, or group of elements, integers or steps.

Any discussion of documents, acts, materials, devices, articles or the like which has been included in the present specification is not to be taken as an admission that any or all of these matters form part of the prior art base or were common general knowledge in the field relevant to the present disclosure as it existed before the priority date of each claim of this application.

SUMMARY

Some embodiments relate to a control system arranged to effect drainage, discharge or the dispelling of at least some fluid from a reservoir in response to a determination that a precipitation event is likely to occur in a vicinity of the reservoir. Some embodiments relate to a method for effecting drainage, discharge or the dispelling of at least some fluid from a reservoir in response to a determination that a precipitation event is likely to occur in a vicinity of the reservoir. By pre-emptively effecting drainage, discharge or the dispelling of at least some fluid from the reservoir in advance of a precipitation event, capacity within the reservoir is made available to accommodate precipitation from a heavy rain or storm. In some embodiments, the reservoir may be a tank or a fluid tank.

Some embodiments relate to a method for controlling operations of at least one fluid tank, the method comprising:
 determining weather data for a particular region, wherein the at least one fluid tank is associated with the region;
 determining operation instructions based on at least the weather data; and
 transmitting a command signal to a controller associated with the at least one fluid tank, wherein the command signal includes operation instructions for activating at least one flow control mechanism associated with the at least one fluid tank.

The method may be operable in a server arranged to communicate with the controller across a communications network.

The method may further comprise monitoring operations of the reservoir including receiving updates regarding operation information and/or reservoir information.

Some embodiments relate to a management system for controlling operations of at least one fluid tank, the management system comprising:
 a wireless transceiver in communication with a controller associated with the at least one fluid tank to allow the management system to communicate with the controller over a communications network;
 a processor for:
  determining weather data for a particular region, wherein the at least one fluid tank is associated with the region,
  determining operation instructions based on at least the weather data; and
  transmitting via the wireless transceiver a command signal to the controller, wherein the command signal includes operation instructions for activating at least one flow control mechanism associated with the at least one fluid tank.

The management system may comprise a memory for storing weather data associated with the at least one fluid tank.

The memory may further be arranged to store tank data associated with each of the at least one fluid tanks, such as monitored fluid levels within the fluid tank, a maximum capacity of the fluid tank, tank usage history, tank filling history, current tank volume, and system health. The management system may be arranged to receive tank data from the controller and/or from a user input.

The memory may further be arranged to store environment data associated with each of the at least one fluid tanks such as drainage information and/or impervious surface areas in a vicinity of the fluid tank. The management system may be arranged to receive tank data from the controller and/or from a user input.

The memory may further be arranged to store operation information associated with each of the at least one fluid tanks, wherein the operation information comprises operation information pertaining to the operation of the at least one flow control mechanism. The management system may be arranged to receive operation information from the controller and/or from a user input.

The management system may be arranged to utilise the reservoir data, the environment data and/or the operation information when determining operation instructions for the at least one fluid tank.

The management system may be arranged to use or extrapolate the weather data, reservoir data, the environment data and/or the operation information to create a discharge schedule for the fluid tank.

The memory may further be arranged to store the discharge schedule and the management system may consult the discharge schedule when determining operation instructions for a fluid tank.

In some embodiments, the processor may be configured to determine a measured fluid level in the at least one fluid tank; determine a capacity of the at least one fluid tank; and determine a volume of fluid to be discharged based on the measured fluid level, the capacity and the weather data; wherein the operation instructions are based on the volume of fluid to be discharged. For example, the processor may be configured to determine a volume of fluid to be discharged based on tank usage history.

In some embodiments, the processor may be configured to determine a threshold fluid level for the at least one fluid tank based on the volume of fluid to be discharged and wherein the operation instructions may comprise the threshold fluid level. The threshold fluid level may be at least one of a minimum fluid level and a maximum fluid level.

Some embodiments relate to a control system for at least one fluid tank, the system comprising:

a controller arranged to control a flow of fluid being discharged from the at least one fluid tank; and a wireless transceiver in communication with the controller to allow the controller to communicate with a remote server over a communications network;

wherein, in response to receipt of information from the remote server via the wireless transceiver, the controller is arranged to issue a command to at least one flow control mechanism associated with the at least one fluid tank to thereby control the flow of fluid discharged from the at least one fluid tank.

The information received from the remote server may be operation instructions for activating the at least one control flow mechanism.

The operation instructions may include at least one of a volume of fluid to be discharged, a volume of fluid to be maintained in the at least one fluid tank, a threshold fluid level for the at least one fluid tank, timing information, indicating a time and duration for activating the flow control mechanism, and/or operation details, indicating a state of operation for the flow control mechanism.

The information received from the remote server may comprise weather data and may include current weather information and predicted weather information.

The controller may be configured to receive an output signal from at least one sensor, and wherein said output signal may comprise information indicative of a measured fluid level within the at least one fluid tank.

The controller may be configured to determine the command based on the information indicative of the measured fluid level and information received from the remote server.

The control system may include a memory accessible to the controller and/or server and arranged to store weather data, tank data, environment data, and/or information pertaining to operation of the flow control mechanism.

The memory may comprise a discharge schedule for the fluid tank, wherein the discharge schedule may include operation information for the fluid tank for a given period of time.

The controller may be configured to receive the discharge schedule from the remote server via the wireless transceiver.

The controller may be configured to create a discharge schedule based on weather data, tank data, environment data, and/or information pertaining to operation of the flow control mechanism.

The controller may be configured to control and monitor operation of the at least one fluid tank and to send stored operation information to the remote server.

The controller may be configured to transmit tank data and/or operation information to the remote server via the wireless receiver.

The controller may be configured to compare the fluid level to a fluid level threshold stored in the memory of the control system and to cause the flow control mechanism to operate to discharge fluid from the fluid tank when the fluid level is greater than or equal to the fluid level threshold.

The controller may be responsive to a command received from the remote server to store a changed fluid level threshold in the memory.

The wireless transceiver may be configured to communicate with the remote server using at least one of a mobile telephony standard protocol or a packet routing protocol. The controller may be configured to be controllable remotely by commands received from the remote server.

The system may further comprise one or more additional devices and one or more additional wireless or wired transceivers or receivers in communication with the controller, to allow the controller to communicate with or receive information from the one or more additional devices.

The one or more additional devices may be flow meters or other instruments for the monitoring of a reservoir or fluid tank network.

The control system may be mains powered and may comprise a backup power supply to power the controller and the wireless transceiver in the absence of adequate mains power. The control system may be powered by a power supply comprising a battery. For example, the battery may comprise a long-life battery or a replaceable battery. The long-life battery may have sufficient stored energy to support normal operation of the control system for several years.

The controller may be further configured to receive an output signal from a fluid switch in the fluid tank indicative of a high fluid level, the controller being configured to operate the at least one flow control mechanism in response to the fluid switch output signal.

Some embodiments relate to a fluid tank network monitoring system, comprising:

a plurality of the described control systems; and a remote server in communication with the wireless transceiver of each of the control systems;

wherein the remote server is configured to monitor operations of each fluid tank based on information received from each control system and to affect operation of each control system by transmission of one or more commands from the remote server to each control system.

The remote server may be arranged to receive or determine weather data pertaining to a vicinity of the fluid tank associated with the control systems.

The remote server may be arranged to receive tank data and/or operation information from the controllers and to store the data in memory.

The remote server may be arranged to utilise the weather data and optionally the tank data and/or the operation information to determine the commands for transmission to the control systems.

The remote server may be arranged to use or extrapolate the weather data, the tank data, the environment data and/or the operation information to create a discharge schedule for the fluid tanks associated with the control systems.

The remote server may be arranged to consult the discharge schedule when determining commands for transmission to the control systems.

The monitoring system may further comprise a computerised user interface in communication with the remote server to allow remote user control of each control system.

The remote server may be configured to determine an alarm condition based on the messages received and to automatically transmit one or more alarm messages to one or more user recipients, the one or more alarm messages including an indication of the alarm condition.

Some embodiments relate to a control system further comprising the flow control mechanism and some embodiments relate to a control system further comprising the flow control mechanism and the sensor.

Some embodiments relate to a reservoir control installation, comprising the described control system and further comprising the at least one flow control mechanism, the at least one sensor and the at least one fluid tank.

Some embodiments relate to a kit for a reservoir control installation, the kit comprising the described control system and further comprising the flow control mechanism, the sensor and the reservoir.

Some embodiments relate to a method for controlling a flow of fluid being discharged from at least one fluid tank, the method comprising: receiving information from a remote server over a communications network; determining a command signal to control the flow of fluid being discharged from the at least one fluid tank based on the information; and transmitting the command to the at least one flow control mechanism associated with the at least one fluid tank to control the flow of fluid being discharged from the at least one fluid tank.

Some embodiments relate to a control system arranged to effect drainage of at least one fluid tank in response to a determination that a precipitation event is likely to occur in a vicinity of the at least one fluid tank.

Some embodiments relate to a method for effecting drainage of at least one fluid tank in response to a determination that a precipitation event is likely to occur in a vicinity of the at least one fluid tank.

Some embodiments relate to a management system for controlling operations of at least one control installation including at least one fluid tank and at least one sewerage tank, the management system comprising: a wireless transceiver in communication with a controller associated with the at least one fluid tank and the at least one sewerage tank to allow the management system to communicate with the controller over a communications network; a processor for: determining operation instructions for the control installation; and transmitting via the wireless transceiver a command to the controller, wherein the command includes operation instructions for activating at least one flow control mechanism associated with the at least one fluid tank.

The processor may be for transmitting via the wireless transceiver a command that may include operation instructions for activating at least one pump associated with the at least one sewerage tank.

The processor may be configured to determine weather data for a particular region, wherein the at least one fluid tank may be in or associated with the region and wherein the operation instructions for the control installation may be based on at least the weather data.

In some embodiments, the memory system may comprise a memory for storing at least one of weather data, fluid tank data, sewerage tank data, environmental data, and operation information associated with the at least one fluid tank and the at least one sewerage tank.

In some embodiments, the processor may be configured to: determine a measured fluid level in the at least one fluid tank; determine a capacity of the at least one fluid tank; determine a volume of fluid to be discharged based on the measured fluid level, the capacity and the weather data; wherein the operation instructions may be based on the volume of fluid to be discharged.

For example, the processor may be configured to determine a volume of fluid to be discharged based on fluid tank usage history. In some embodiments, the processor may be configured to determine a threshold fluid level for the at least one fluid tank based on the volume of fluid to be discharged and wherein the operations instructions may comprise the threshold fluid level.

The processor may be arranged to receive information from the controller over the communications network, wherein the information may comprise data associated with the at least one fluid tank and the at least one sewerage tank.

The data may comprise operations information associated with the at least one flow control mechanism and/or the pump.

Some embodiments relate to a control system for at least one fluid tank and at least one sewerage tank, the control system comprising: a controller arranged to control a flow of fluid being discharged from the at least one fluid tank and to control supply of power to at least one pump associated with the at least one sewerage tank, and a wireless transceiver in communication with the controller to allow the controller to communicate with a remote server over a communications network; wherein the controller is arranged to issue a command to at least one flow control mechanism associated with the at least one fluid tank to thereby control the flow of fluid being discharged from the at least one fluid tank in response to receiving a command from the remote server via the wireless transceiver.

The controller may be arranged to control the supply of power to the pump to thereby pump fluid out of the sewerage tank in response to receiving a command from the remote server via the wireless transceiver.

In some embodiments, the controller may be configured to transmit information to the remote server via the wireless transceiver. The information may comprise data relating the at least one fluid tank and/or the at least one sewerage tank. The information may comprise data relating to operations of the at least one flow control mechanism and/or the at least one pump.

Some embodiments relate to a method for controlling operations of a control installation comprising at least one fluid tank and at least one sewerage tank, the method operable in a server located remotely from the control installation, the method comprising: determining operation instructions for the control installation; and transmitting a command signal to a controller associated with the at least one fluid tank and at least one sewerage tank, wherein the command signal includes operation instructions for activating at least one flow control mechanism associated with the at least one tank.

In some embodiments, the method may further comprise transmitting via the wireless transceiver a command signal to the controller, wherein the command signal may include operation instructions for controlling supply of power to a pump associated with the at least one sewerage tank.

The method may further comprise determining weather data for a particular region, wherein the at least one tank may be associated with the region; and determining operation instructions for the control installation based on the weather data.

The method may comprise receiving information from the controller over the communications network, wherein the information may comprise data associated with the at least one fluid tank and at least one sewerage tank.

Some embodiments relate to a method for controlling operations of a control installation comprising at least one fluid tank and at least one sewerage tank, the method operable in a control system associated with the control installation, the method comprising: receiving information from a remote server over a communications network; determining a command signal to control the flow of fluid being discharged from the at least one fluid tank based in the information; and transmitting the command signal to the at least one flow control mechanism associated with the at least one fluid tank to control the flow of fluid being discharged from the at least one fluid tank.

In some embodiments, the method may further comprise determining a command signal to control operations of the pump; and transmitting the command signal to the at least one pump associated with the at least one sewerage tank to control operations of the pump to thereby pump fluid out of the at least one sewerage tank.

The method may further comprise transmitting information to the remote server from the control system, wherein the information may comprise data pertaining to the at least one fluid tank and/or the at least one sewerage tank

BRIEF DESCRIPTION OF THE DRAWINGS

Embodiments are described in further detail below, by way of example, with reference to the accompanying drawings, in which.

DETAILED DESCRIPTION

Figure 1:
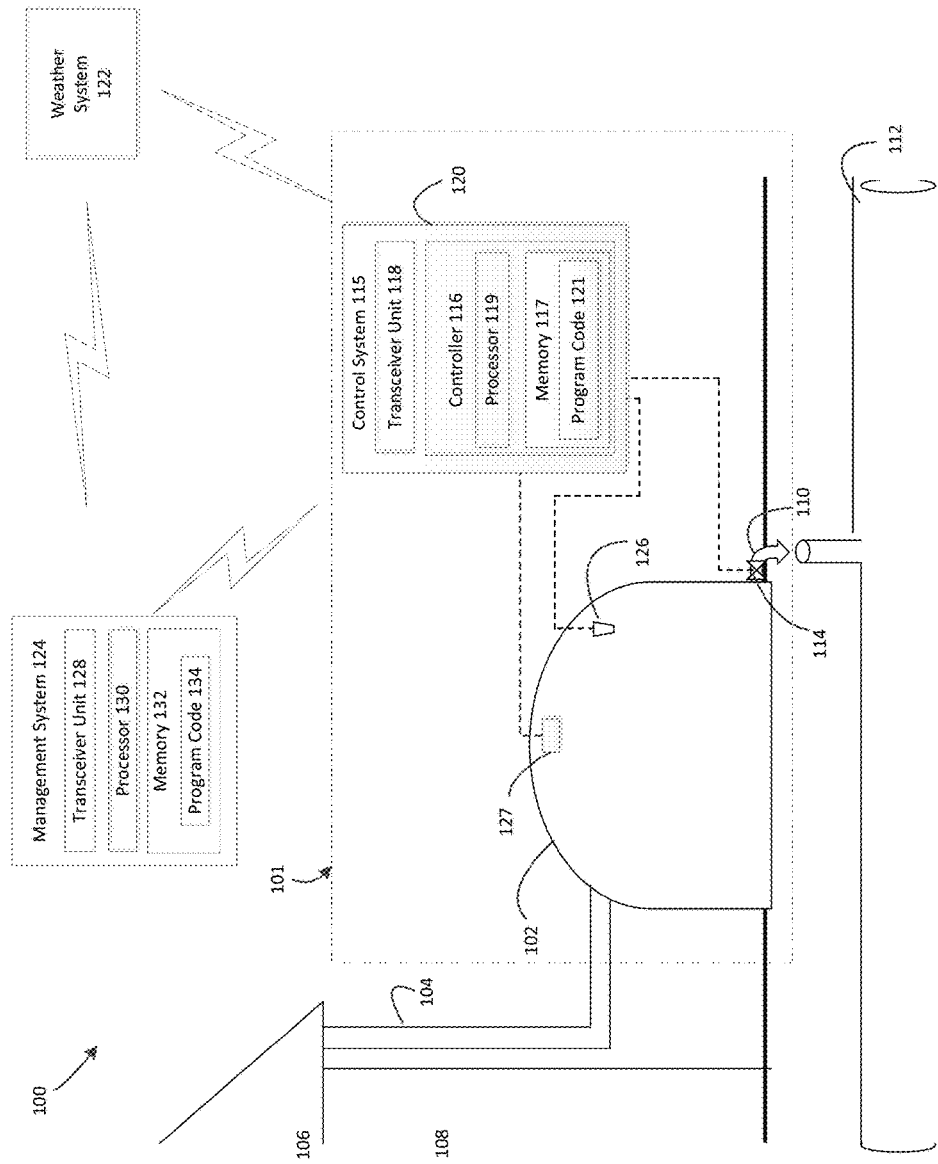
FIG. 1 is a schematic representation of a reservoir network monitoring system including a reservoir control installation having a control system according to some embodiments.

Described embodiments generally relate to systems and methods of controlling components associated with reservoirs, such as flow control mechanisms or valves. Some embodiments specifically relate to control systems for reservoirs, while other embodiments relate to systems for managing a network of reservoirs including described control systems. Further embodiments relate to reservoir control installations or kits therefor that include the control systems.

One manner of alleviating stormwater "runoff" may be to attempt to capture and retain some of the stormwater and hence retard the peak flow. This may assist in extending the life of existing expensive stormwater infrastructure. However, in congested city environments, the option of constructing a large retention basin may not always be viable. A more preferable manner of handling the situation may be to provide a system that can truncate these peak stormwater flows within a city environment without the need for huge retention basins.

Accordingly, some embodiments described relate to using a plurality of reservoirs or fluid tanks or water tanks to capture and retain water during or after a heavy rain or storm event as a cost effective and minimally intrusive way of truncating or at least partially absorbing peak flows. In some embodiments, fluid may be discharged from the reservoirs or tanks before the predicted rain event to ensure the reservoirs have sufficient capacity to receive "runoff". In some embodiments, a control system is provided to activate at least one flow control mechanism, such as a valve, of at least one reservoir to allow fluid to escape from the at least one reservoir.

The control system may determine whether or not to activate a flow control mechanism based on parameter values including static and dynamic reservoir or tank data, such as monitored fluid levels within the reservoir, a maximum capacity of the reservoir, reservoir usage history, reservoir filling history, current reservoir volume, and system health, weather data, including current and/or predicted weather information, and environment data, such as drainage and impervious surface areas in a vicinity of the reservoir. The control system may further determine a state in which a flow control mechanism is to operate to thereby control a rate of flow of fluid being discharged from the reservoir.

In some embodiments, reservoir data, weather data and/or environment data is stored at the control system. For example, the control system may be arranged to receive weather data from a weather system or management system. The control system may be capable of receiving dynamic reservoir data, such as fluid levels in the reservoir, from at least one sensor provided at or within the reservoir. The control system may be arranged to receive static or dynamic reservoir data and environment data from user inputs, and/or from a management system.

In some embodiments, a management system is employed to determine operation activities of the at least one flow control mechanism of at least one the reservoir. For example, the management system may be arranged to maintain static and dynamic reservoir data, weather data and/or environment data. In some embodiments, the management system may be arranged to receive data updates from the control system regarding the dynamic reservoir data, such as reservoir fluid levels. The management system may further maintain flow control mechanism operational information which may be utilised to determine a state in which the flow control mechanism is to operate. The management system may be arranged to monitor weather patterns and derive weather data therefrom, or receive weather data from a weather system. For example, if it is determined that the fluid levels for a reservoir are relatively high, and the weather data indicates that a heavy rain is expected in the geographical area where the reservoir is located, the management control system may issue a command to the control system to cause the control system to activate the flow control mechanism to operate in a particular state to discharge fluid from the reservoir to ensure sufficient capacity in the reservoir to receive water "runoff" expected from the predicted rain event.

In some embodiments, determination as to when and to what extent the at least one flow control mechanism should be activated is carried out in part by the management system and in part by the control system. For example, in one embodiment, the management system may notify the control system of a threshold value for the fluid level of a reservoir and the control system may activate a valve if the fluid level in the reservoir exceeds the threshold value. In some embodiments, the management system is arranged to control a network of control systems. In some embodiments, each control system may be associated with a plurality of flow control mechanisms and/or a plurality of reservoirs.

In some embodiments, the controller and/or the management system may use or extrapolate reservoir data, weather data and/or environment data to predict future reservoir levels, future capacity of the reservoir and/or how much fluid the reservoir may capture in the future, for example for a period of seven days, and may utilise such predicted data to gauge whether to discharge fluid from the reservoir at a particular day or time to accommodate expected precipitation. The predicted data may be employed to create a discharge schedule for the reservoir, which may be utilised by the controller and/or management system to determine when to instigate a discharge of fluid from the reservoir and/or a volume of fluid to be discharged. A feedback mechanism may be employed to update or amend the discharge schedule in view of reservoir data, weather data and/or environment data, and in particular, more recent reservoir data, weather data and/or environment data.

The purpose of such features and functions is to harness the potential of existing infrastructure to retain "runoff" and effectively truncate the peak flow. It is envisaged that such features and functions may prolong the lifespan of existing infrastructure and minimise the impact of peak flows on natural waterways that form an integral part of a stormwater network.

Referring to FIG. 1, there is shown a reservoir control monitoring system 100 including a reservoir control installation 101. The reservoir control installation 101 includes a reservoir 102 connected via a conveyor or pipe 104 to a roof 106 of a building 108, or to other types of fluid-collecting infrastructure, for example, such as a car park. The reservoir 102 may include an outlet 110 for conveying fluid, and in particular, water from the reservoir 102 to a drainage pipe 112, provided underground or to a creek, grassed area or other suitable location. In some embodiments, the reservoir 102 is a tank. For example, the reservoir or tank may be a water tank or a fluid tank, such as a domestic rainwater tank.

The outlet 110 is provided with one or more flow control mechanisms 114, (referred to for convenience as "flow control mechanism 114") such as a valve, to enable a flow of fluid from the reservoir 102 to be controlled and regulated. In one embodiment, the valve may comprise a solenoid valve, although any suitable controlling mechanism may be employed. In one embodiment, the flow control mechanism 114 is disposed at or on the outlet 110 of the reservoir 102.

In some embodiments, the flow control mechanism 114 may transition between a blocking state, wherein the outlet 110 is substantially closed off, preventing fluid from being discharged from the tank 102 and a conveying state, wherein the outlet 110 is substantially open, allowing fluid to be discharged from the tank 102. In some embodiments the flow control mechanism 114 may also operate in a transitionary state, whereby a portion of a cross sectional area of the outlet 110 is blocked to allow for fluid to be discharged from the tank 102 at a reduced rate than that allowed by the conveying state. In one embodiment, the transitionary state comprises a plurality of sub states to provide for varying rates of fluid flow through the outlet 110.

In some embodiments, there is provided a control system 115 comprising a controller 116 arranged to communicate with the flow control mechanism 114. The controller 116 comprises a memory 117 and at least one processor 119 configured to execute program instructions or code 121 stored in the memory 117 to perform the methods disclosed herein. A number of set points and control parameters for operation of the flow control mechanism 114 may also be stored in the memory 117.

In one embodiment, the flow control mechanism 114 is electrically or wirelessly coupled to the controller 116 and operates in accordance with instructions received from the controller 116. For example, the flow control mechanism 114 may receive a command from the controller 116 to assume one of a blocking state, a conveying state, or a transitionary state. In one embodiment, the flow control mechanism 114 may receive a command to assume a particular sub state of a transitionary state.

The control system 115 may further comprise a wireless transceiver unit 118. The controller 116 may be associated with the wireless transceiver unit 118 and may be enabled for two-way communication via the transceiver unit 118 with a remote server over wireless telecommunications infrastructure, for example using a standard GSM mobile telephony protocol or a packet routing protocol. The controller 116 may also be enabled for one- or two-way communication with external devices, such as flow meters or other instruments (not shown), via additional transceiver or receiver units over a low power wireless communication protocol, for example, ZigBee or other IEEE 802.15 protocols, Bluetooth or IEEE 802.11 protocols, or a wired communication protocol. The controller 116 may include or be in the form of a serial communication and data acquisition (SCADA) unit, which effectively functions as a programmable logic controller (PLC). The controller 116 may have a suitable serial data connection with the transceiver unit 118. The controller 116 may be a suitable DNP3 SCADA pack 100 controller from Control Microsystems, for example, or may be a bespoke design. Other controllers may be used in the reservoir control installation 101 and may employ the DNP3 communications protocol or another suitable communications protocol to perform functions of the controller 116 described herein.

The transceiver unit 118 may be a NetComm NTC-6908 industrial 3G cellular network router, for example, or may be a bespoke design. The transceiver unit 118 may thus provide a point-to-point or point-to-multi-point communication capability in order to suitably interface with a remote server. The transceiver unit 118 may use a suitable domain name system (DNS) capability so that any subscriber identity module (SIM) in the transceiver unit 118 can be interchanged with another such SIM.

In some embodiments, the control system 115 may be powered by a power supply (not shown). The power supply may be a mains power supply and/or may comprise a battery such as a long-life battery or a replaceable battery. For example, the long-life battery may have sufficient stored energy to support normal operation of the control system 115 for several years. The controller 116 may also be connected to a backup power supply (not shown) such as a battery. For example, the backup power supply may be arranged to power the controller 116, the transceiver unit 118 and/or one or more sensors 126 for sensing fluid levels in the reservoir 102.

The control system 115 including the controller 116 and the transceiver unit 118 may be provided within a housing 120 and the transceiver unit 118 may include a transmitting and receiving antenna (not shown) concealed within the housing 120. In one embodiment, the housing 120 is formed of a suitable non-conductive material to allow sufficient signal transmission strength out of and in to the housing 120.

In some embodiments, the controller 116 may receive information via the transceiver unit 118 from an external source or remote server, such as a weather system 122 provided by a government or private weather source, for example, the Bureau of Meteorology, or a management system 124.

In one embodiment, the weather system 122 or the management system 124 may be arranged to transmit weather data, such as current weather or predicted rain or snowfall, to the controller 116. In some embodiments, the weather data is local or regional information, relating to a geographical location of the controller 116 and/or the reservoir 102 associated with the controller 116.

In some embodiments, the controller 116 may employ the weather data to determine whether to activate the flow control mechanism 114 to discharge fluid from the reservoir 102 to ensure there is sufficient capacity to retain expected rainfall and runoff. The controller may activate the flow control mechanism 114 to discharge fluid retained in the reservoir 102 immediately, or soon after receipt of the weather data or may schedule activation of the flow control mechanism 114 to discharge any fluid retained in the reservoir 102 for a later specified time.

In some embodiments, the management system 124 may comprise a transceiver unit 128, similar to transceiver 118, to provide for wireless communications with the controller 116 and the weather system 122. The management system 124 may further include a processor 130 and a memory 132. The memory 132 may be arranged to store program code 134 and the processor 130 may be configured to execute the program code 134 to perform the methods disclosed herein.

In one embodiment, the management system 124 may be arranged to monitor weather patterns and determine weather data including weather forecast information, or to obtain weather and weather forecast information from the weather system 122 via transceiver unit 128, or elsewhere, and utilise the information to determine current and predicted precipitation, for example, rain or snow fall. In some embodiments, the weather data may be local or regional weather information, relating to a geographical location of the controller and/or the reservoir 102 associated with the controller 116. The management system 124 may employ the weather data to determine whether the flow control mechanism 114 of a particular reservoir 102 should be activated, and if so, to what extent. In response to determining that the flow control mechanism should be activated, the management system 124 may transmit a signal to the controller to activate the flow control mechanism in accordance with particular instructions.

In some embodiments, the management system 124 may be arranged to communicate with multiple controllers 116 provided in multiple control systems, each being arranged to control a flow control mechanism 114 of a reservoir 102. The management system 124 may be arranged to receive weather data from the weather system 122, or elsewhere, to utilise the data to determine current weather or predicted rain or snow fall for geographical locations or regions associated with the reservoirs, and to issue commands to the controllers 116 to take an appropriate action. For example, weather data may indicate that heavy rainfall is due in a certain geographical location. The management system 124 may determine that a particular set or subset of reservoirs 102 are located in that region, and in response, may issue a command to the controllers 116 associated with the set or subset reservoirs 102 to discharge fluid from the reservoirs 102 to ensure capacity for retaining water from the expected heavy rainfall. Accordingly, by pre-emptively and automatically discharging fluid from the reservoirs 102, capacity may be provided to capture the expected rainfall, thereby limiting the possibility of stormwater overflow and/or flooding.

In general, reservoirs 102 and in particular, domestic or residential water tanks are employed to retain water to be later used for irrigation purposes or within a residence or building, for example, for washing clothes and flushing toilets, to thereby reduce mains water usage. Thus, it may be desirable to retain fluid in the reservoir for such activities and only discharge fluid deemed necessary to provide sufficient capacity to accommodate a volume of expected or estimated "runoff". Accordingly in some embodiments, no fluid or not all of the fluid in the reservoir will be discharged in advance of an expected rain event.

To this end, the reservoir 102 may be provided with the one or more sensors 126 (referred to for convenience as "sensor 126") to sense fluid levels in the reservoir 102. The sensor 126 may be a pressure transducer, for example, and may be arranged to have a sensing head generally submerged below a fluid level in the reservoir 102 in order to obtain a relatively constant and accurate measure of a fluid level within the reservoir 102. In other embodiments, the sensor 126 may be an ultra-sonic sensor.

The sensor 126 may be arranged to communicate with the controller 116 to thereby provide the controller 116 with a constant, or sufficiently regular as to be effectively constant, or a periodic measurement of the fluid level within the reservoir 102. The controller 116 may store in its memory 117 measured fluid level data or changes in measured fluid level data when it changes by a predetermined amount, such as a percentage amount or a number of millimetres, for example. Similarly, other measured parameters or operational statuses may be recorded in the controller's memory 117 when they change and may be time-stamped as of when they occur. This stored data may be uploaded via the transceiver unit 118 to the management system 124 periodically, such as every 24 hours, or on demand from the management system 124.

In some embodiments, static reservoir data such as a maximum capacity of the reservoir, and dynamic reservoir data, such as fluid levels, reservoir usage history, reservoir filling history, current reservoir volume, and system health, may be stored in the memory 117 of the controller 116. This stored reservoir data may be uploaded via the transceiver unit 118 to the management system 124 or may be provided to the management system 124 by any other suitable means, for example, by user input via a web browser, as will be described in more detail below.

In some embodiments, in addition to weather data, reservoir data, such as a total capacity of the reservoir and/or current fluid levels, may be employed by the controller 116 or management system 124 to determine a volume of fluid to discharge from the reservoir 102. For example, in some situations, when heavy rains or a storm is predicted in the geographical location of the reservoir 102, the controller or management system 124 may determine that the reservoir 102 should be emptied or substantially emptied by discharging all or most of the fluid from the reservoir 102 to ensure maximum capacity for retaining the expected rainfall.

A smaller forecast rain event would not necessarily require all the fluid in the reservoir 102 to be ejected. For example, where the predicted rainfall is expected to produce "runoff" of a particular volume, and wherein that volume amounts to a percentage of the total volume of the reservoir, the controller 116 or management system 124 may determine that fluid already stored within the reservoir 102 be retained, or only a certain volume of the fluid stored in the reservoir 102 be discharged, while still providing an expected sufficient capacity for retaining "runoff" from the expected rainfall. In some embodiments, the controller 116 or management system 124 may determine whether and how much fluid to discharge from a reservoir based on a comparison of the total capacity of the reservoir, the current fluid levels of the reservoir and an expected volume of precipitation.

All combinations of roof and tank react differently to volume and intensity of a rain event. Thus, in some embodiments, in addition to reservoir data, environment data relating to the reservoir control installation 101, such as drainage and impervious surface areas in a vicinity of the reservoir, may be stored in the memory 117 of the controller or in the memory 132 of the management system 124 and employed by controller or management system to assist in determining whether fluid should be discharged from a given reservoir 102, and if so, a volume of fluid to be discharged, or a level to which to reduce the fluid in the reservoir. Thus, each reservoir control installation 101 may have settings catered to their specific needs and environment.

In some embodiments, weather data, reservoir data and/or environment data is employed to determine a suitable rate of flow for fluid to be discharged from a particular reservoir 102. The rate of flow of fluid may be controlled by controlling the flow control mechanism 114, and in particular, by setting the flow control mechanism 114 to operate in a selected sub-state of the transitionary state.

Thus, data relating to the reservoir control installation, such as reservoir data and/or environment data may be stored in the memory 117 of the controller 116 and/or may be stored at the management system 124, and may be employed by the controller and/or the management system 124 to determine operation conditions and to control the operation of the flow control mechanism 114. In some embodiments, the controller 116 or management system 124 or both the controller 116 and management system 124 may determine whether and to what extent to activate the flow control mechanism 114 based on any combination of weather data, reservoir data and environment data and may determine a suitable operation state for the flow control mechanism based on the weather data, reservoir data and/or environment data.

In some embodiments, the controller 116 and/or the management system 124 may use or extrapolate reservoir data, weather data and/or environment data to predict future reservoir levels, future capacity of the reservoir and/or how much fluid the reservoir may capture in the future, for example for a period of seven days. This predicted data may be utilised to gauge whether to discharge fluid from the reservoir 102 at a particular day or time to accommodate expected precipitation.

In some embodiments, the predicted data may be employed to create a discharge schedule for the reservoir 102. The discharge schedule may indicate discharge information or a reservoir 102 for a particular period of time, for example, a week. The discharge information may include a date, time, volume of fluid, and/or flow control rate for discharging of fluid from the reservoir, a minimum/maximum fluid level for the reservoir and any other suitable information. In some embodiments the predicted data, and/or the discharge schedule is stored in the memory 117 associated with the controller 116 and/or the memory 132 of the management system 124.

The controller 116 and/or management system 124 may utilise the discharge schedule to determine when to instigate a discharge of fluid from the reservoir 102. A feedback mechanism (not shown) may be employed to update or amend the discharge schedule in view of reservoir data, weather data and/or environment data, and in particular, more recent reservoir data, weather data and/or environment data.

In some embodiments, the management system 124 is capable of assessing a performance of a reservoir 102 for a given rain event based on feedback such as updated dynamic reservoir data received from the controller 116 during or after a rain event. The management system 124 may be arranged to use the feedback to adjust weightings associated with reservoir data, weather data and/or environment data when determining operation instructions for the flow control mechanism 114. For example, feedback may indicate that a particular reservoir overflowed as there wasn't sufficient capacity in the reservoir to accommodate the "runoff" caused by a particular rain event. The management system 124 may employ such feedback to ensure that a greater volume of fluid is discharged from the reservoir 102 to provide increased capacity in anticipation of a similar expected rain event. In this way, the management system 124 is capable of self-learning based on the feedback provided by the controller 116 and may modify its behaviour based on the feedback.

In one embodiment, the reservoir 102 further includes a float switch 127, which may be in communication with the controller 116, for example, by means of an electrical coupling. In some embodiments, the float switch 127 may be wirelessly coupled to the controller 116. The float switch 127 is provided as a high level fail safe, so that if the fluid level in the reservoir 102 exceeds a shut-off level associated with the float switch 127, the float switch 127 provides a warning signal to the controller 116, to cause the controller to activate the flow control mechanism 114 to discharge fluid from the reservoir 102. In one embodiment, the float switch 127 is electrically or wirelessly coupled to the flow control mechanism 114 and may communicate directly with the flow control mechanism 114 to activate the flow control mechanism 114 to discharge fluid from the reservoir 102 in the event that the fluid level in the reservoir 102 exceeds the shut-off level.

Figure 2:
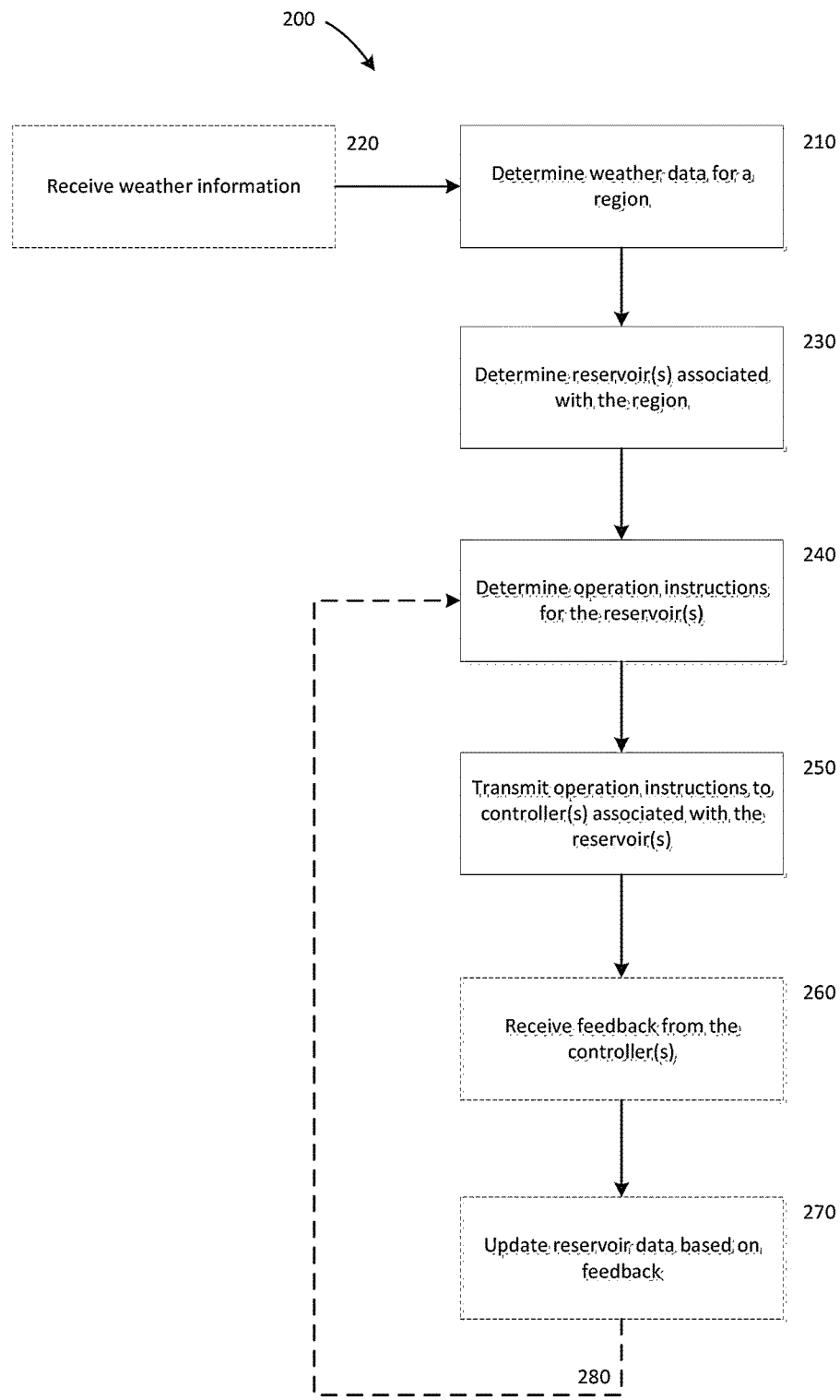
FIG. 2 is a flow diagram depicting an exemplary method of controlling an operation of a reservoir.

Referring now to FIG. 2, there is shown a flow diagram depicting an exemplary method 200 of controlling an operation of a reservoir, which may be carried out at a remote server, such as management system 124. For example, the processor 130 of the management system 124 may be configured to execute program code 134 stored in the memory 132 to cause the management system 124 to perform the method 200.

Method 200 begins at 210, when weather data for a particular region is determined In one embodiment, at 220, weather data for a particular region may be derived from weather information received from a third party source, such as a weather forecasting service or weather system 122. Alternatively, the management system 124 may be capable of determining weather information, and accordingly weather data for a particular region independent of such a weather forecasting service.

At 230, the management system 124 determines any reservoir(s) which are considered to be associated with the region, for example, reservoirs 102 which are located within the region, or in proximity to the region. In one embodiment, the management system 124 is arranged to consult data stored in the memory 132 of the management system to determine the reservoirs associated with the region and which may be affected by the determined weather data.

At 240, the management system 124 determines operation instructions for the reservoir(s) 102 determined at 230 of the method. The operation instructions for a reservoir 102 may depend on an extent to which the reservoir is expected to be affected by the weather data. For example, if the weather data predicts heavy rain fall to pass close by a location of a particular reservoir, the management system may determine the reservoir need not necessary have full capacity available to accommodate the expected rain fall, and may determine that a percentage of the overall capacity of the reservoir is sufficient.

Furthermore, the management system may determine a rate of flow of fluid to be discharged from the reservoir. The management system may employ environment data associated with the reservoir, and/or calendar information, for example, timing information to determine a suitable time and rate of flow for the fluid to be discharged. For example, if the reservoir is associated with a residential building, and the expected precipitation event is expected in the early afternoon, the management system may schedule the activation of the fluid control mechanism to discharge fluid from the reservoir after midday, to thereby allow the residence to utilise any fluid in the reservoir during the morning.

Furthermore, for example, if a heavy rain event or storm is expected to pass over a region in a relatively short period of time, and the environment data indicates that a reservoir is surrounded by a large number of impervious surface areas, the management system 124 may instruct the controller 116 to direct the fluid control mechanism 114 to operate in a fully open or conveying state to maximise a rate of flow of fluid being discharged from the reservoir.

In another example, if it is determined that a number of reservoir(s) 102 within a given region are discharging or are expected to discharged at a given time or within a given time period, the management system 124 may instruct the controllers 116 of the reservoir(s) 102 to direct the associated fluid control mechanism 114 to operate in a state such as a transitionary state to thereby control the rate of flow of fluid being discharged from the reservoir(s) 102 so that it is more than zero and less than the maximum rate.

In some embodiments, the management system 124 employs reservoir data, such as current fluid levels in the reservoir 102 and total volume capacity of the reservoir 102 to determine whether or not to cause fluid to be discharged from the reservoir 102 and if so, how much fluid to discharge from the reservoir. Thus, the operation instructions may include a specific volume to be discharged from a particular reservoir 102, or may include a maximum fluid level or volume for the reservoir in view of the predicted or current weather data.

Thus, the operations instructions may include information pertaining to a volume of fluid to be discharged from the reservoir 102, scheduling information for discharging the fluid and a rate of flow of the fluid being discharged.

At 250, the management system 124 transmits operation instructions to a controller 116 associated with the reservoir 102. In response to receipt of the operation instructions, the controller 116 activates the flow control mechanism 114 in accordance with the operation instructions.

The controller 116 may be arranged to monitor and record performance information associated with the reservoir 102, and may employ the level sensor 126 to do so. For example, such performance information may include indications of fluid levels, a time taken to discharge a certain volume of fluid from the reservoir, and indications of leakage or blockage problems. At 260, the management system 124 may be arranged to receive feedback regarding the reservoir control installation 101 and the feedback may comprise the performance information from the controller.

At 270, the management system 124 may update reservoir data stored in the memory 132 of the management system 124 based on the feedback received from the controller 116. In some embodiments, the method 400 may include a feedback loop 280 to revert to 240, and the management system 124 may be configured to determine operation instructions for the reservoir(s) based on the updated reservoir data and at 250, to transmit the operation instructions to the controller(s).

Figure 3:
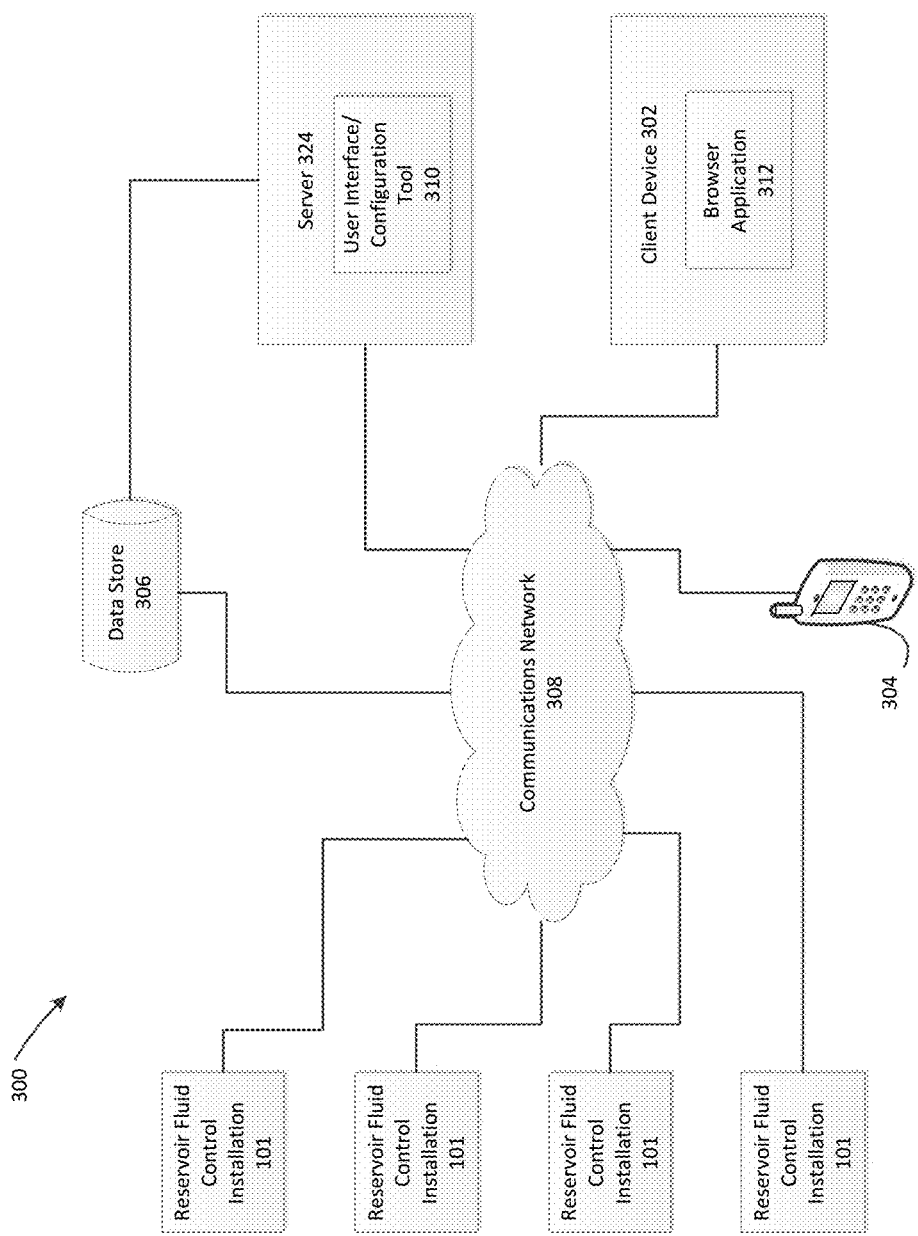
FIG. 3 is a schematic diagram of a communications network including the reservoir network monitoring system of FIG. 1.

Referring now to FIG. 3, there is shown a monitoring system 300 comprising multiple reservoir control installations 101. The monitoring system 300 comprises multiple installations 101 located in different geographic locations across one or more zones. The multiple installations 101 may be part of a single zone within a larger network or may be spread across different zones and/or different networks. By way of example only, each zone may have one, two, three, four, five, six, seven, eight, nine, ten or more installations 101 located at different positions within the zone. Further, there may be more than ten, for example between ten and possibly hundreds of such installations 101 within a particular zone and/or network.

The monitoring system 300 further comprises one or more servers or server systems, such as management system 124, referred to herein for convenience as server 324, optionally at least one wired client device 302 and/or at least one mobile client device 304, such as a laptop computer, a smartphone or tablet, and a data store 306, accessible to the server 324. The server 324 is arranged to receive reservoir data from installations 101 such as data representative of the sensed conditions of the fluid level in the reservoir 102 at various different locations. This data is received over a communications network or a data network 308 comprising suitable communications infrastructure that is at least partially wireless, such as a cellular network. For example, the transceiver units 118 of installations 101 may be configured to transmit data to server 324 using the GSM or GPRS/3G standards for mobile telephony or their technological successors. Alternatively, lower power, shorter distance wireless communication techniques may be employed, for example where a local wireless data hub is in sufficient proximity to support wireless communication with the transceiver unit 118 within a nearby installation 101.

The server 324 processes the data received from the transceiver units 118 and stores it in the data store 306 for subsequent retrieval as needed. The data store 306 may comprise any suitable data store, such as a local, external, distributed or discrete database.

If the data received at the server 324 from the installations 101 indicates an alarm condition in any one or more of the installations 101, the server 324 accesses the data store 306 to determine a pre-determined appropriate action to be taken in relation to the specific alarm condition, and then takes the appropriate action. The action to be taken may vary, depending on the installation 101, for example where some installations 101 may play a more critical monitoring role than others. Such actions may include, for example, sending one or more notifications, for example in the form of text messages and/or emails, to one or more of the client devices 302, 304.

Figure 4:
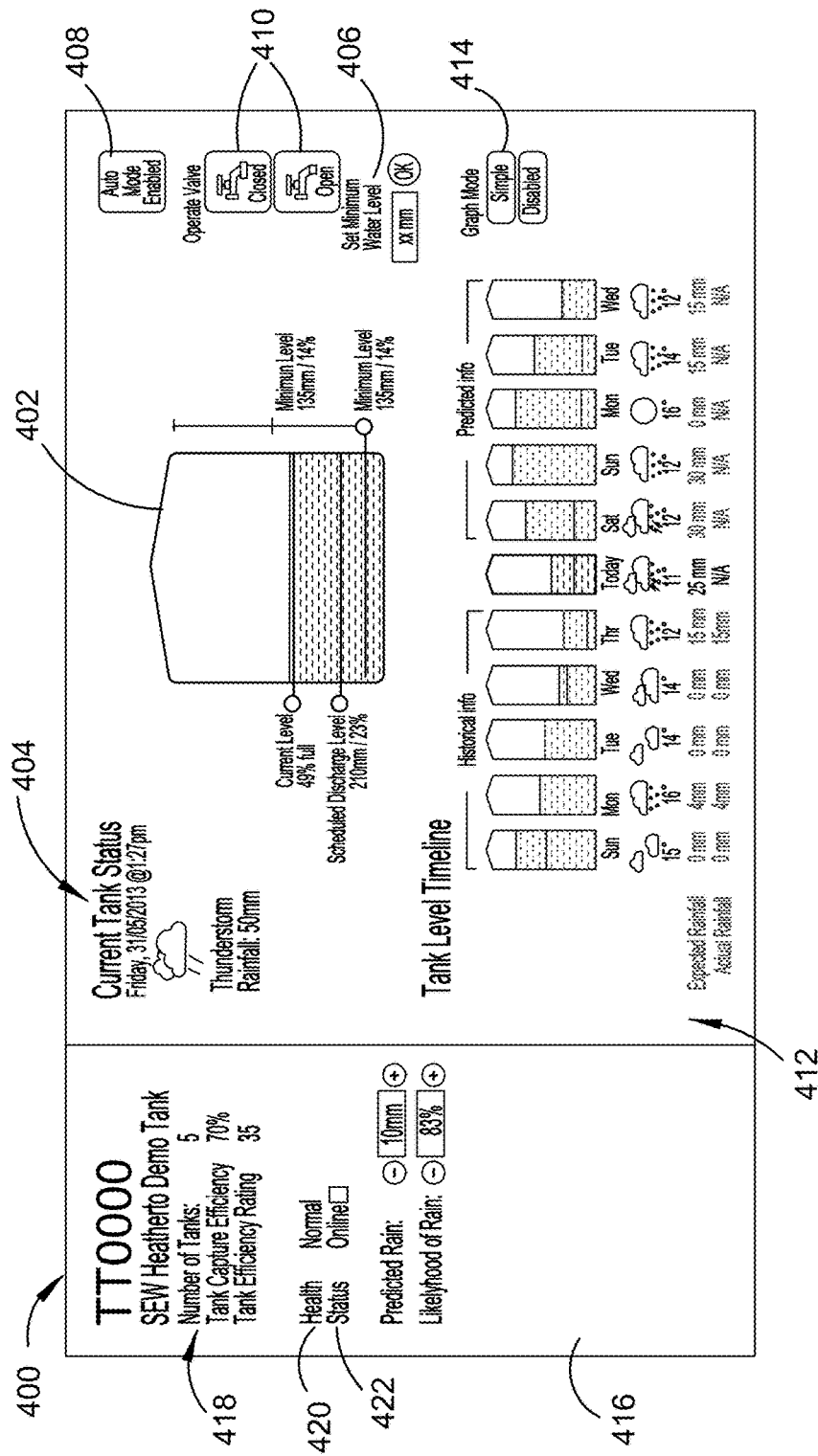
FIG. 4 is an example of a user interface display generated by interface components of the monitoring system and depicting an overview of data relating to the reservoir control installation of FIG. 1.
Figure 5:
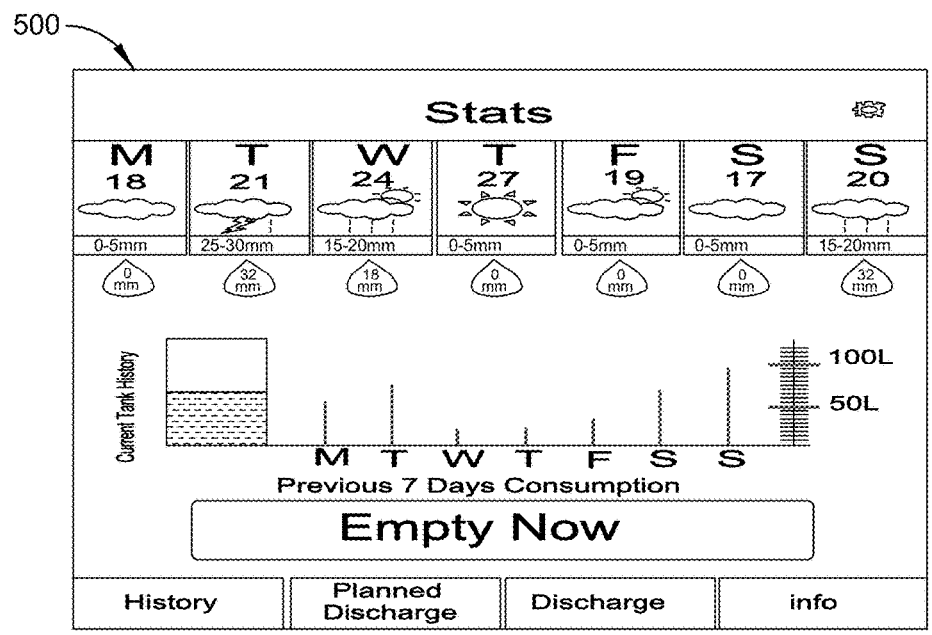
FIG. 5 is a further example of a user interface display generated by interface components of the monitoring system depicting statistics associated with the reservoir control installation of FIG. 1.
Figure 6:
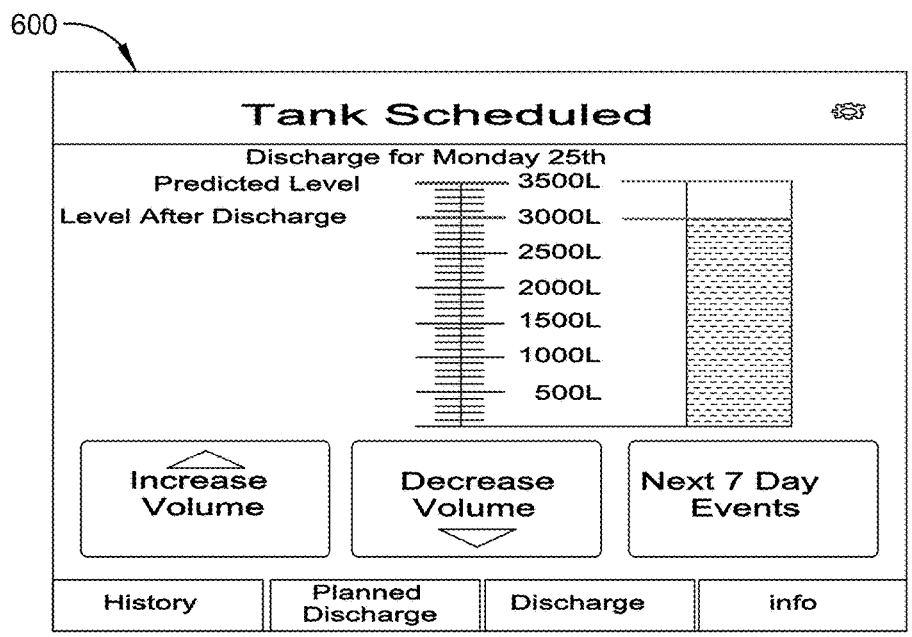
FIG. 6 is a further example of a user interface display generated by interface components of the monitoring system depicting a representation of a reservoir for a particular day.

Regardless of whether an alarm condition is indicated by the data received at the server 324 from installations 101, the data is processed and stored in data store 306 for later retrieval by a server process and/or at a request from a client device 302, 304. For example, the server 324 may execute processes (based on program code stored in data store 306, for example), to perform trending and reporting functions to one or more client devices 302, 304. For example, the server 124 may provide a client device 302, 304 with information to enable generation of a display 400, 500, 600, 700, 800, 900, 1000, 1100 or 1200 (FIG. 4, 5, 6, 7, 8, 9, 10, 11 or 12 respectively) at the client device 302, 304 in response to a request for such information or automatically at regular intervals. For example, as shown in FIG. 4, display 400 may include a graphical representation 402 of a particular reservoir 102 depicting fluid levels for a given day, and a timeline 420, depicting historical fluid levels, current fluid levels and predicted fluid levels of the reservoir.

The server 324 executes a user interface 310 based on locally accessible stored program code to allow users of client devices 302, 304 to access configuration, control, monitoring and reporting functions of server 324 with respect to installations 101. The user interface 310 thus acts as a control and configuration tool accessible to users of client devices 302, 304. The user interface, control and configuration functions of user interface 310 are primarily performed by server 324, but some functions may be executed in part by the browser application 312 on client devices 302, 304 based on code, including applets for example, served to the respective client devices 302, 304 from server 324.

In alternative embodiments, instead of the browser application 312, each client device 302, 304 may execute a specialised software application stored in local memory accessible to the processor of the device. This specialised application may perform various user interface functions locally and communicate with the server 324 as necessary. For example, for mobile client computing devices 304, the specialised application may be in the form of a "smart phone" application.

Displays 400, 500, 600, 700, 800, 900, 1000 and 1100 shown in FIGS. 4, 5, 6, 7, 8, 9, 10 and 11, respectively, may be generated at client device 202, 204 by a suitable software application executing on the client device 202, 204, such as a browser application 212 executed by a processor of the client device 202 according to program code stored in the local storage accessible to that processor.

In some embodiments, the transceiver unit 118 is enabled for bidirectional communication with the server 224, so that new fluid level thresholds or targets can be set, static and dynamic reservoir data and environment data can be uploaded, control commands can be issued, firmware updates can be received and/or diagnostic monitoring and testing can be performed remotely. In some embodiments of system 200, the transceiver unit 118 of each installation may be configured to send a message directly to a mobile communication device of an end user (i.e. client device 202, 204) when an alarm condition is determined by the controller 116. This may be instead of or in addition to sending the message to the server 224.

The monitoring system 200 thus comprises a series of reservoir control installations 101 located around an area or zone for which operational status is desired to be monitored. These installations 101 communicate with the server 224, which in turn communicates with client devices 202, 204 as necessary. The server 224 also tracks and stores historical data received from the installations 101 and processes the incoming and historical data according to rules stored in data store 206 to determine whether adjustment is required to rules for activation of the flow control mechanisms associated with the controllers 116 of the installations 101. In the monitoring system 200, each installation 101 may be configured to have the same or a similar set of operational parameters (i.e. alarm levels, sensor sampling times, reporting intervals, etc.) and may have the same set of sensors 122 and general configuration.

The browser application 212 may be based on program code and/or data served from the server 224, and may be arranged to provide a user with a graphical user interface (GUI) by mean of which the user can monitor and control operations of the installation 101. In some embodiments, the user may log on to their account using a username and password, to operate their installations, modify settings and review performance history of the installations.

Display 400 in FIG. 4 is an example of a user interface display generated by browser application 212 based on program code and/or data served from the server 224. Display 400 has a graphical representation 402 of a fluid reservoir 102 of a particular installation 101. The graphical representation 402 depicts an indication of a current fluid level (for example, 49% of the reservoir's total capacity) of the reservoir 102, and a scheduled discharge level (for example, 210 mm or 23% of the reservoir's total capacity) depicting the volume of fluid which should remain once the scheduled discharging of fluid occurs. A minimum level threshold of the reservoir 102 (shown in this case as 135 mm, and 14% of the reservoir's total capacity) is depicted and may indicate a level at which fluid is no longer discharged from the reservoir 102 when the flow control mechanism is in the conveying or 'open' state, or may represent a desired minimum level of fluid to be maintained in the reservoir 102. Time, date and current weather information 404 is displayed in proximity to the graphical representation 402.

A control option 406 may be provided to allow a user or operational personnel to set a minimum fluid level for the reservoir 102. An operation mode indicator 408 may be provided to indicate whether an automatic mode of operation is enabled. In some embodiments, operation mode indicator 408 is a user selectable option, which is effective to enable or disable the automatic operation of the management system 124. An operate valve indicator 410 may be provided to indicate a state of the flow control mechanism or valve 114, for example, whether the valve is "open", i.e. in a conveying state, or "closed", i.e. in a blocking state. In some embodiments, operate valve indicator 410 is a user selectable option, which is effective to activate or deactivate the flow control mechanism 114 and/or to select a state of operation of the flow control mechanism 114.

Display 400 may further include a timeline 412 depicting historical information, current information and predicted information. The historical information may include fluid levels recorded, weather data such as temperatures, expected rainfall and actual rainfall over a given time period, such as daily for a number of days. Similarly, the predicted information may include fluid levels predicted, weather data such as expected temperatures and expected rainfall over a given time period, such as daily for a number of days. The current information may include current fluid levels and current weather data, for example, current temperature and expected rainfall for a given period, such as a single day. Display 400 may provide a user selectable option 414 to view the timeline 412 in a simple format, as depicted in FIG. 4, or in a more detailed format, which may include additional information such as fluid levels recorded at smaller increments of time, such as hourly over the course of a day, or more detailed information regarding weather patterns.

Display 400 may include a sidebar 416, depicting an overview 418 of information regarding the reservoir 102, including a reservoir name, TT0000, a number of installations 101 in a particular group, zone or catchment area, a capture efficiency measurement, an efficiency rating of the reservoir, an indicator of the health of the reservoir, and an indicator of the status of the reservoir. The sidebar may further include a user selectable option 420 for setting a predicted rain value and a user selectable option 422 for setting a percentage likelihood of rain. In one embodiment, the user selectable predicted rain value and the user selectable rain likelihood percentage enable the user to provide minimum levels to trigger a discharge of fluid from the reservoir. Thus, the user may observe their system in operation and historical performance associated with the reservoir and/or system and may adjust limited set points using the user selectable options 420 and 422, for example.

Displays 500, 600, 700, 800, 900, 1000 and 1100, are examples of user interface displays generated by browser application 212 based on program code and/or data served from server 224, and in one embodiment, are adapted specifically for "smart phone" applications. Displays 500, 600, 700, 800, 900, 1000 and 1100 each include tab options labelled "History", "Planned Discharge", "Discharge", and "Info", to enable the user to navigate through the various user interface displays generated by the browser application 212.

Display 500 is a statistics display and depicts a volume of fluid collected by the reservoir 102 each day over a period of a week, as well as weather information including rainfall volumes for each day of the week. Display 500 further daily consumption of fluid from the reservoir over the course of the week. Display 500 may also indicate the fluid levels in the reservoir 102. Display 500 may provide a user-selectable option, which when activated is effective to cause the management system to issue a command to the controller 116 to activate the flow control mechanism 114 to empty the reservoir 102.

Display 600 includes a representation of the reservoir 102 for a particular day and includes an indication of a predicted fluid level for the particular day and a fluid level after a scheduled discharge of fluid from the reservoir 102. Display 600 may further include user selectable options to increase or decrease the fluid level after discharge. In this way, the user is able to control volume of fluid to be held in the reservoir after the discharge is complete. Display further includes a user selectable option to view the following 7 day events, as depicted in display 700 of FIG. 7.

Figure 7:
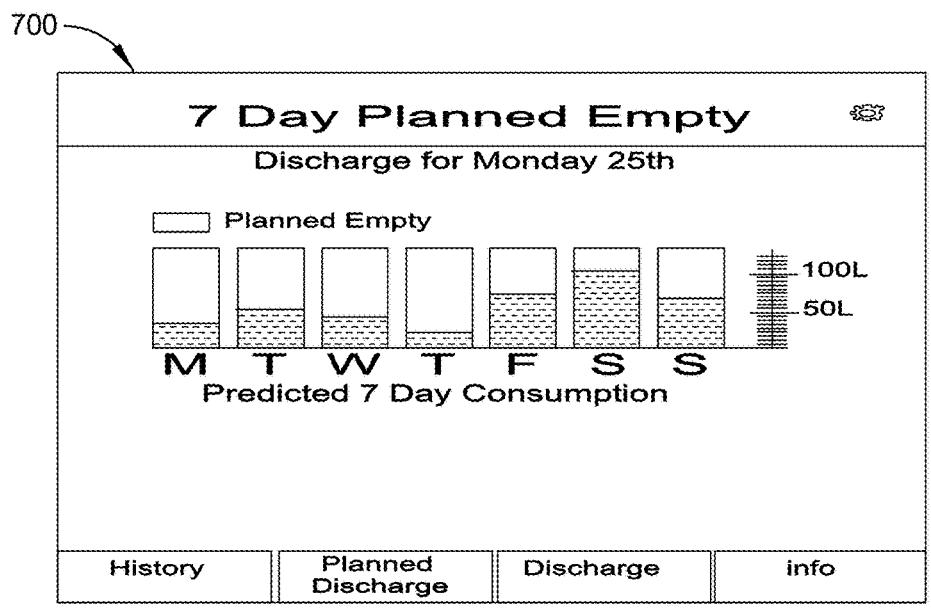
FIG. 7 is a further example of a user interface display generated by interface components of the monitoring system and depicting a chart of reservoir capacity for a seven day plan.

Display 700 of FIG. 7 depicts a chart of reservoir capacity for a seven day plan, and in particular, may depict fluid levels of the reservoir for the seven days, and accordingly a volume of the reservoir which is planned to be empty, or available to retain expected or unexpected rainfall.

Figure 8:
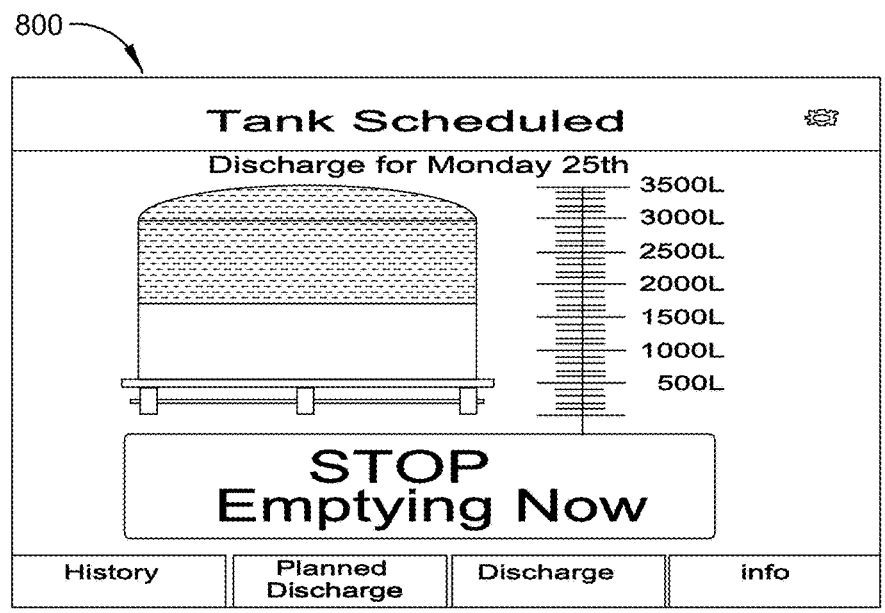
FIG. 8 is a further example of a user interface display generated by interface components of the monitoring system and depicting a representation of a reservoir as it is being discharged.

FIG. 8 is a display 800 depicting a representation of a reservoir 102 as it is being discharged, or having fluid discharged from it on a particular day. The display 800 provides a user selectable option, which if activated by a user, causes the managing system to issue a command to the controller 116 associated with the reservoir 102 to deactivate the flow control mechanism 114 to stop fluid being discharge or discharged from the reservoir 102.

Figure 9:
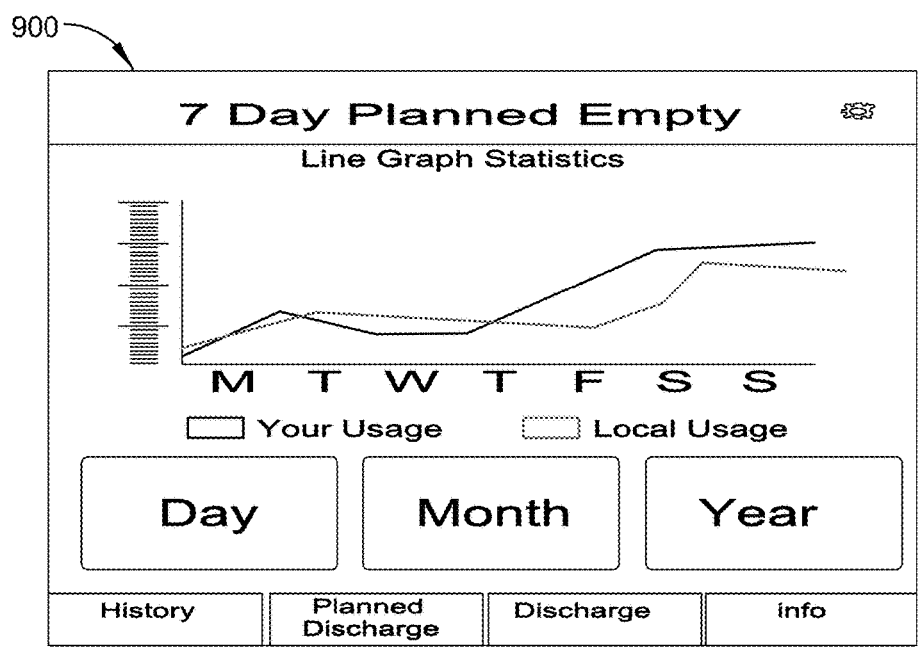
FIGS. 9 to 11 are examples of user interface display generated by interface components of the monitoring system and depicting graphical plots of reservoir fluid usage.

FIG. 9 is a display 900 depicting a graphical representation or plot of a consumption history associated with the reservoir for a particular week, and a graphical representation of a consumption history associated with local usage by a neighbouring reservoir, or an average of neighbouring reservoirs in a particular group or zone for the week. The display 900 provides a user selectable option to cause the display to show the graphical representations of the consumption history across the course of a week, a month or a year.

Figure 10:
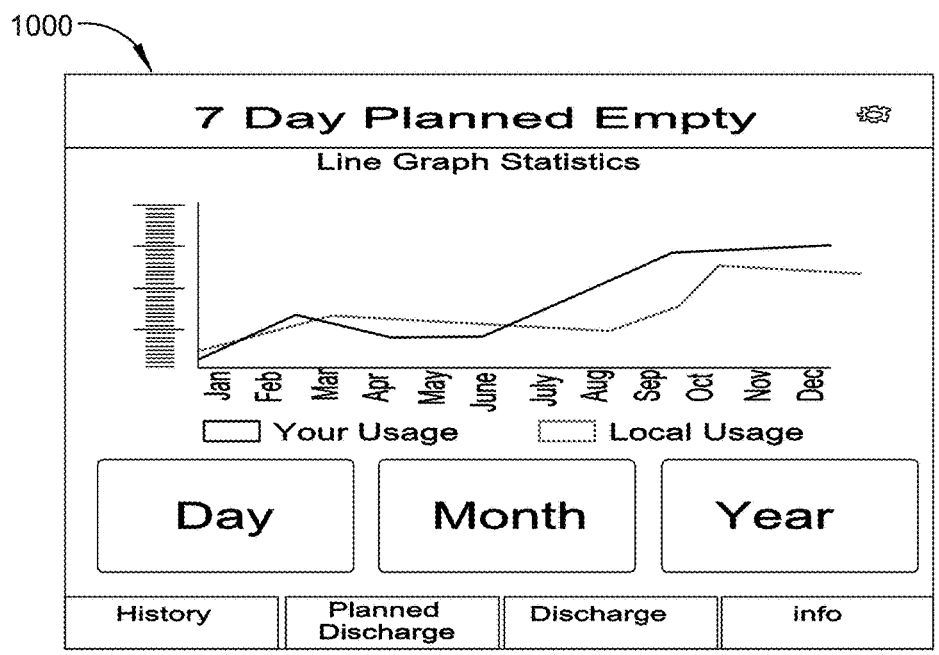

FIG. 10 is a display 1000 depicting a graphical representation or plot of fluid levels of the reservoir 102 monthly for a particular year, and a graphical representation of average fluid levels of neighbouring reservoirs over the same time period. The display 1000 provides a user selectable option to cause the display to show the graphical representations of the fluid levels across the course of a week, a month or a year.

Figure 11:
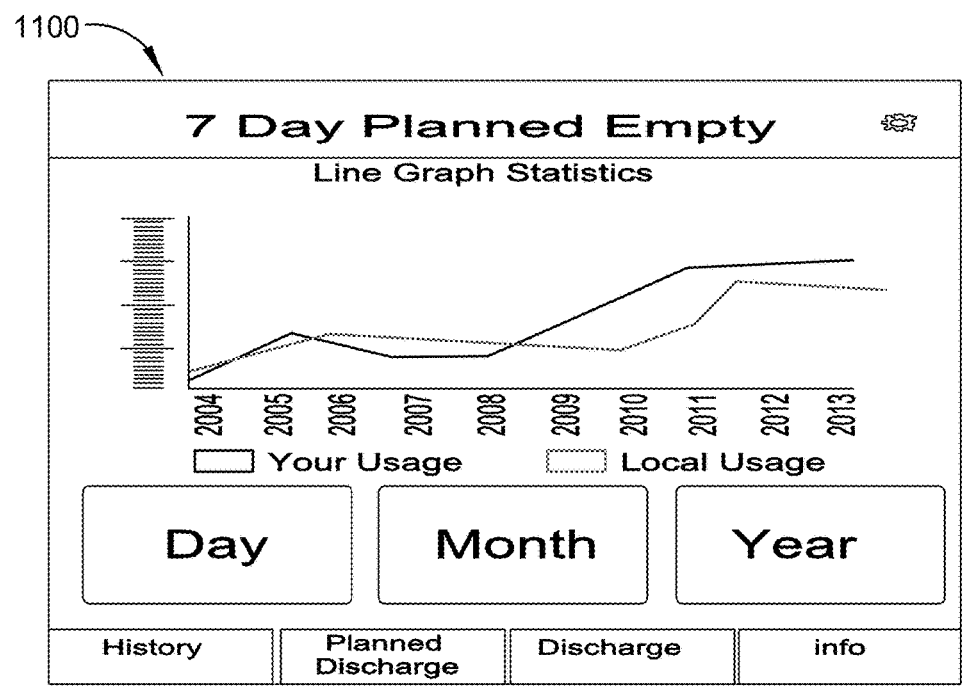

FIG. 11 is a display 1100 depicting a graphical representation or plot of a volume of fluid discharged from the reservoir 102 annually for a number of consecutive years, and a graphical representation of average volumes of fluid discharged from neighbouring reservoirs over the same time period. The display 1100 provides a user selectable option to cause the display to show the graphical representations of volumes of fluid discharged across the course of a week, a month or a year.

Thus, the user interface displays generated by browser application 212 may enable a user to monitor the system in operation and to view historical performance of the controller and/or reservoir. The user interface display may provide the user with a user selectable option to instigate discharging or draining of the reservoir. It also may allow the user to set future discharge or drain levels, for example, for the next seven days, and to thereby override an automatic operation of the system. It may also allow the user to switch off an automatic drain function on any particular day. It may allow the user to observe the predicted tank levels and discharge or drain levels of the coming 7 days. It also allows the user to observe their consumption history from the reservoir, the drain down history and the reservoir level history over a period of days, months or years.

Advantages of the described embodiments provide an improved method and system for addressing problems associated with "runoff". Remote control and monitoring of installations is supported by use of a mobile telephony standard protocol to facilitate point-to-point or point-to-multi-point communication between the server 224 and the controller 116 of each installation. There are also substantial advantages in providing the level sensor output from each level sensor 126 to the controller 116 and the remote server 224 on a regular basis, to allow monitoring and optimised usage of reservoirs when a number of installations 101 are monitored and controlled separately or together as part of the same monitoring system 200. The described embodiments allow calculation of real time fluid volumes, which provides accurate engineering data for planning and design purposes.

Further advantages associated with described embodiments include the ability to infer the likelihood of leakage from one or more installations 101. For example, for a given installation, 100, the number of level changes during a particular period, such as the time between 2.00 a.m. and 3.00 a.m., together with a measure of the amount of level change over time (such as millimetres per minute) can indicate the likelihood of a leak at the site of the installation 101. Maintenance personnel can therefore be dispatched to the site to investigate before the leakage becomes a significant problem. The described embodiments therefore allow organisations, such as those responsible for maintenance of the network of reservoirs and/or water drainage, to identify and address problems with one or more installations 101 before they develop into a complaint by the inhabitant of the domicile 108.

Figure 12:
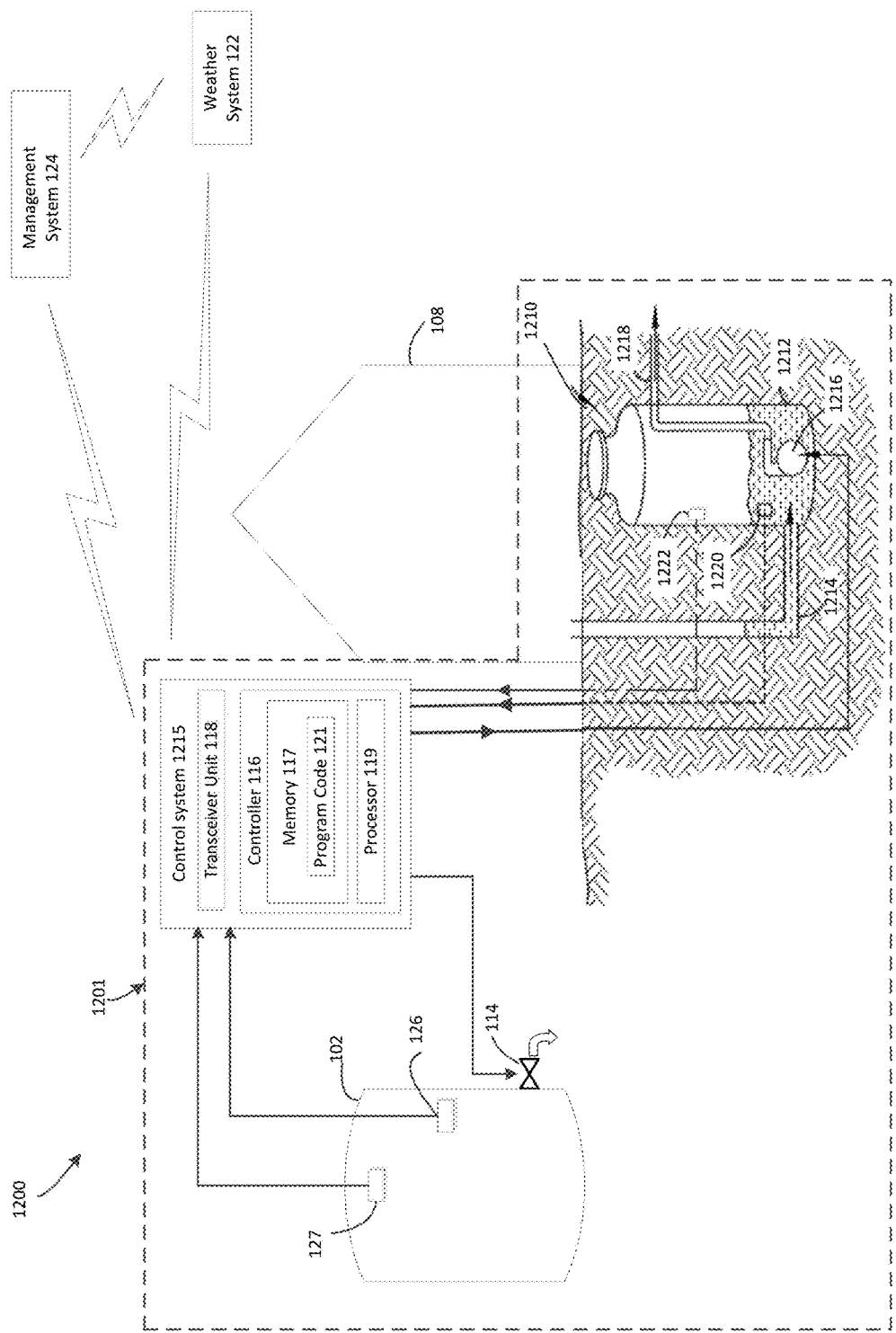
FIG. 12 is a schematic representation of a network monitoring system including a control installation having a control system, a reservoir or fluid tank, and a sewerage tank, according to some embodiments.

Referring to FIG. 12, there is illustrated a schematic representation of a network monitoring system 1200 including a control installation 1201 having a control system 1215, the reservoir or tank 102, and a sewerage tank 1210, such as a buried sewerage tank. For example, the control installation 1201 may comprise a reservoir control installation 101 and a pressure sewer installation, such as that disclosed in International patent application no. PCT/AU2012/000903, the content of which is incorporated herein by reference.

In accordance with embodiments described above, the tank 102 is associated with a flow control mechanism 114 to enable a flow of fluid from the tank 102 to be controlled, and one or more sensors 126 for sensing fluid levels in the tank 102. The reservoir may also be associated with a float switch 127 provided as a high level fail safe control.

The control system 1215 may comprise the components of reservoir control system 115 including, for example, the transceiver unit 118 and the controller 116 comprising the processor 119 and the memory 117 including program code 121.

In accordance with embodiments described above, the controller 116 may be coupled to flow control mechanism 114 and may be configured to control the operations of the flow control mechanism 114, for example, by transmitting operation instructions to the flow control mechanism 114. The operation instructions may be based on tank data, such as measured fluid levels received from the one or more sensors 126 and/or information received from the management system 124 and/or the weather system 122. For example and as discussed in embodiments described above, the information received from the management system 124 may comprise or be based on weather data, reservoir or tank data, environmental data, operation information pertaining to the operation of the flow control mechanism 114, and/or a discharge schedule.

Furthermore, the controller 116 may employ transceiver 118 to transmit information to a remote server, such as the management system 124 and/or the weather system 122. Again, as discussed in embodiments described above, such information may comprise or be based on reservoir or tank data, environmental data, operation information pertaining to the operation of the flow control mechanism 114, and/or a discharge schedule.

Referring again to FIG. 12, the sewerage tank 1210 may comprise a fluid reservoir 1212 arranged to receive waste water from a domicile or building 108 via an inlet conduit 1214. The fluid reservoir 1212 may house a pump 1216 therein, such as a pressure sewer pump. The pump 1216 may be arranged to pump fluid out of the reservoir 1212 via a fluid outlet conduit 1218, for example, into a reticulated sewerage network of fluid conduits.

The sewerage tank 1210 may also include at least one level sensor 1220 and at least one float switch 1222. The level sensor 1220 may be a pressure transducer, for example, and may be wirelessly connected to the control system 1215 or may be in electrical communication with the control system 1215 via suitable means, such as an electrical cable. The pump 1216 may operate under the control of the control system 1215, only turning on and off in response to the action of a suitable pump contactor (relay) that supplies mains power to the pump 1216, for example, from a mains power supply (not shown).

The level sensor 1220 may be arranged to have the sensing head generally submerged below the fluid level in order to obtain a constant accurate measure of the fluid level within the fluid reservoir 1212 and provide a constant (or sufficiently regular as to be effectively constant) output signal to the control system 1215. The float switch 1222 may be provided as a high level fail safe, so that when the fluid level in the reservoir 1212 gets above the shut-off level of the float switch 1222, the float switch 1222 provides a fluid level high signal to the control system 1215, which causes the pump 1216 to begin pumping fluid out of the reservoir 1212 (if it was not already doing so).

In some embodiments, the memory 117 may be arranged to store operation information pertaining to operation of the pump 1216. The instructions or program code 121 stored in the memory 117 of the controller 116, when executed by the processor 119, may cause the controller 116 to cause the pump 1216 to operate to pump fluid out of the fluid reservoir 1212. For example, the controller 116 may control the operation of the pump 1216 by controlling the supply of power to the pump.

In some embodiments, the controller 116 is configured to control and monitor operation of the pump 1216 and to send stored operation information to the management system 124. The operation information may include measured fluid level information.

The controller 116 may be configured to compare a measured fluid level received from the level sensor 1220 to a fluid level threshold stored in the memory 117 of the controller 116 and to cause the pump 1216 to operate to pump fluid out of the fluid reservoir 1212 when the fluid level is greater than or equal to the fluid level threshold. In some embodiments, the controller 116 is responsive to a command received from the management system 124 to store a changed fluid level threshold in the memory 117.

In some embodiments, the management system 124 may control a plurality of network monitoring systems 1200 and may issue instructions across the communications network 308 to the control systems 115 to cause the controllers 116 to operate the flow control mechanisms 114 and/or the pumps 1212 and/or to modify stored operation instructions used by the controller 116 to control the operations of the flow control mechanisms 114 and/or the pumps 1212.

It will be appreciated by persons skilled in the art that numerous variations and/or modifications may be made to the above-described embodiments, without departing from the broad general scope of the present disclosure. The present embodiments are, therefore, to be considered in all respects as illustrative and not restrictive.

The invention claimed is:

1. A management system for controlling operations of at least one fluid tank, the management system comprising:
 a wireless transceiver in communication with a controller of a control device associated with the at least one fluid tank to allow the management system to communicate with the controller over a communications network, the controller being configured to provide feedback data relating to a previous discharge of fluid from the at least one tank;
 a processor for:
  determining weather data for a particular region, wherein the at least one fluid tank is associated with the region,
  determining a threshold fluid level for the at least one fluid tank based on a capacity of the at least one fluid tank, the weather data, and the feedback data;
  transmitting via the wireless transceiver a command signal to the controller, wherein the command signal includes operation instructions for activating at least one flow control mechanism associated with at least one fluid tank.

2. The management system of claim 1, further comprising a memory for storing weather data associated with the at least one fluid tank.

3. The management system of claim 2, wherein the memory is further arranged to store tank data associated with each of the at least one fluid tanks, wherein the tank data includes at least one of monitored fluid levels within the fluid tank, a maximum capacity of the fluid tank, tank usage history, tank filling history, current tank volume, and system health.

4. The management system of claim 2, wherein the memory is arranged to store environment data associated with each of the at least one fluid tanks including at least one of drainage information and/or impervious surface areas in a vicinity of the fluid tank.

5. The management system of claim 2, wherein the memory is arranged to store operation information associated with each of the at least one fluid tanks, wherein the operation information comprises operation information pertaining to the operation of the at least one flow control mechanism.

6. The management system of claim 1, wherein the management system is arranged to receive at least one of tank data and operation information from the controller.

7. The management system of claim 3, wherein the processor is arranged to utilise at least one of the tank data, the environment data and/or the operation information when determining operation instructions for the at least one fluid tank.

8. The management system of claim 3, wherein the processor is arranged to use the weather data, tank data, the environment data and/or the operation information to create a discharge schedule for the at least one fluid tank.

9. The management system of claim 8, wherein the processor is arranged to consult the discharge schedule when determining operation instructions for the at least one fluid tank.

10. The management system of claim 1, wherein the processor is configured to:
 determine a measured fluid level in the at least one fluid tank;
 determine a capacity of the at least one fluid tank; and
 determine a volume of fluid to be discharged based on the measured fluid level, the capacity and the weather data;
 wherein the threshold fluid level is based on the volume of fluid to be discharged.

11. The management system of claim 10, wherein the processor is configured to determine a volume of fluid to be discharged based on tank usage history.

12. The management system of claim 1, wherein the threshold fluid level is at least one of a minimum fluid level indicative of a minimum level of fluid to be retained in the at least one tank and a maximum fluid level indicative of a maximum level of fluid to be retained in the at least one tank.

13. The management system of claim 1, wherein the command signal includes operation instructions for activating the at least one flow mechanism in at least one of:
 a conveying state in which an outlet of the at least one flow mechanism is substantially open to allow fluid to be discharged from the at least one fluid tank; and
 a transitory state in which fluid is discharged from the tank at a reduced rate compared to the conveying state.

14. A control system for at least one fluid tank, the system comprising:
 a controller arranged to control a flow of fluid being discharged from the at least one fluid tank in accordance with a stored threshold fluid level in a memory of the control system; and
 a wireless transceiver in communication with the controller to allow the controller to communicate with a remote server over a communications network;
 wherein, the controller is arranged to
  provide feedback data relating to a previous discharge of fluid from the at least one tank,
  determine a command to control a flow of fluid to be discharged from the at least one tank based on the threshold fluid level, a measured fluid level in the at least one tank and the feedback data, and
  issue the command to at least one flow control mechanism associated with the at least one fluid tank to thereby control the flow of fluid discharged from the at least one fluid tank.

15. The control system of claim 14, wherein the information received from the remote server comprises operation instructions for activating the at least one control flow mechanism.

16. The control system of claim 15, wherein the operation instructions include at least one of a volume of fluid to be discharged, a volume of fluid to be maintained in the at least one fluid tank, the threshold fluid level for the at least one fluid tank, timing information, indicating a time and duration for activating the flow control mechanism, and operation details, indicating a state of operation for the flow control mechanism.

17. The control system of claim 14, wherein the information received from the remote server is weather data comprising at least one of current weather information and predicted weather information.

18. The control system of claim 14, wherein the controller is configured to receive an output signal from at least one sensor and wherein said output signal comprises information indicative of a measured fluid level within the at least one fluid tank.

19. The control system of claim 14, further comprising a memory accessible to the controller and arranged to store at least one of weather data, tank data, environment data, and operation information pertaining to operation of the at least one flow control mechanism.

20. The control system of claim 19 wherein the memory comprises a discharge schedule for the at least one fluid tank, wherein the discharge schedule includes operation information for the at least one fluid tank for a given period of time.

21. The control system of claim 20, wherein the controller is configured to receive the discharge schedule from the remote server via the wireless transceiver.

22. The control system of claim 14, wherein the controller is configured to create a discharge schedule based on weather data, tank data, environment data, and/or information pertaining to operation of the at least one flow control mechanism.

23. The control system of claim 14, wherein the controller is configured to control and monitor operation of the at least one fluid tank and to send stored operation information to the remote server.

24. The control system of claim 14, wherein the controller is configured to transmit at least one of tank data and operation information to the remote server via the wireless receiver.

25. The control system of claim 18, wherein the controller is configured to compare the fluid level to a fluid level threshold stored in the memory and to cause the at least one flow control mechanism to operate to discharge fluid from the at least one fluid tank when the fluid level is greater than or equal to the fluid level threshold.

26. The control system of claim 14, wherein the wireless transceiver is configured to communicate with the remote server using at least one of a mobile telephony standard protocol and a packet routing protocol.

27. The control system of claim 14, wherein the control system comprises a backup power supply to power the controller and the wireless transceiver in the absence of adequate mains power.

28. The control system of claims 14, wherein the controller is configured to receive an output signal from a fluid switch in the at least one fluid tank indicative of a high fluid level, and the controller is configured to operate the at least one flow control mechanism in response to the fluid switch output signal.

29. A fluid tank network monitoring system, comprising:
a plurality of the control systems as claimed in claim 14; and
a remote server in communication with the wireless transceiver of each of the control systems;
wherein the remote server is configured to monitor operations of each fluid tank based on information received from each control system and to affect operation of each control system by transmission of one or more commands from the remote server to each control system.

30. The fluid tank network monitoring system of claim 28, further comprising a computerised user interface in communication with the remote server to allow remote user control of each control system.

31. The fluid tank network monitoring system of claim 28, wherein the remote server is configured to determine an alarm condition based on the information received and to automatically transmit one or more alarm messages to one or more user recipients, the one or more alarm messages including an indication of the alarm condition.

32. The fluid tank network monitoring system of claim 28, wherein the remote server is arranged to receive or determine weather data pertaining to a vicinity of the fluid tanks associated with the control systems.

33. The fluid tank network monitoring system of claim 28, wherein the remote server is arranged to receive tank data and/or operation information from the controllers and to store the data in memory.

34. The fluid tank network monitoring system of claim 28, wherein the remote server is arranged to utilise the weather data to determine the commands for transmission to the control systems.

35. The fluid tank network monitoring system of claim 32, wherein the remote server is arranged to utilise the tank data and/or the operation information to determine the commands for transmission to the control systems.

36. The fluid tank network monitoring system of claim 32, wherein the remote server is arranged to use or extrapolate the weather data, the tank data, the environment data and/or the operation information to create a discharge schedule for the at least one fluid tank associated with the control systems.

37. The fluid tank network monitoring system of claim 36, wherein the remote server is arranged to consult the discharge schedule when determining commands for transmission to the control systems.

38. The fluid tank network monitoring system of claim 29, further comprising at least one fluid tank, at least one flow control mechanism and at least one sensor.

39. The control system of claim 14, wherein the command signal includes operation instructions for activating the at least one flow mechanism in at least one of:
a conveying state in which an outlet of the at least one flow mechanism is substantially open to allow fluid to be discharged from the at least one fluid tank; and
a transitory state in which fluid is discharged from the tank at a reduced rate compared to the conveying state.

* * * * *